(12) United States Patent
Diederiks et al.

(10) Patent No.: US 8,442,976 B2
(45) Date of Patent: May 14, 2013

(54) ADAPTATION OF LOCATION SIMILARITY THRESHOLD IN ASSOCIATIVE CONTENT RETRIEVAL

(75) Inventors: Elmo Marcus Attila Diederiks, Eindhoven (NL); Bartel Marinus Van De Sluis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 438 days.

(21) Appl. No.: 11/719,976

(22) PCT Filed: Nov. 30, 2005

(86) PCT No.: PCT/IB2005/053980
§ 371 (c)(1),
(2), (4) Date: Dec. 18, 2007

(87) PCT Pub. No.: WO2006/059291
PCT Pub. Date: Jun. 8, 2006

(65) Prior Publication Data
US 2008/0091728 A1    Apr. 17, 2008

Related U.S. Application Data

(60) Provisional application No. 60/632,137, filed on Dec. 1, 2004.

(51) Int. Cl.
*G06F 17/30* (2006.01)
(52) U.S. Cl.
USPC .......................................................... 707/724
(58) Field of Classification Search ........................ None
See application file for complete search history.

(56) References Cited

U.S. PATENT DOCUMENTS

| | | | | |
|---|---|---|---|---|
| 5,616,876 | A * | 4/1997 | Cluts | 84/609 |
| 6,498,982 | B2 * | 12/2002 | Bellesfield et al. | 701/202 |
| 6,701,307 | B2 * | 3/2004 | Himmelstein et al. | 707/743 |
| 6,954,697 | B1 * | 10/2005 | Smith | 701/533 |
| 7,231,405 | B2 * | 6/2007 | Xia | 707/104.1 |
| 7,281,021 | B2 * | 10/2007 | Shiota et al. | 382/284 |
| 7,487,072 | B2 * | 2/2009 | Semple et al. | 703/3 |
| 7,689,621 | B1 * | 3/2010 | Huber et al. | 707/743 |
| 2001/0054665 | A1 * | 12/2001 | Heimann | 242/364.1 |
| 2002/0099696 | A1 | 7/2002 | Prince | |

(Continued)

OTHER PUBLICATIONS

The Logarithmic Scale, as of Oct. 16, 2004,http://web.archive.org/web/20041016055629/http://www.ieer.org/clssroom/log.html.*

(Continued)

*Primary Examiner* — Neveen Abel-Jalil
*Assistant Examiner* — Kevin L Young

(57) ABSTRACT

Retrieval of similar content item or documents is provided based on similarity of their location or place. A base location is determined, for example using a GPS device. Location of one or more identified anchor document(s), in a database for example, is determined by extracting location data. Then a first threshold is set based on a criterion distance determined between the base location and the anchor item location. A candidate document item location is identified and the location data for candidate content item may be extracted. A distance between the base location and the candidate location may be determined as a candidate distance. A candidate content item may be selected as similar for retrieval based on the first candidate distance and the first threshold. The notion of criterion distance-determined granularity for setting a threshold is provided.

16 Claims, 2 Drawing Sheets

U.S. PATENT DOCUMENTS

| | | | |
|---|---|---|---|
| 2002/0188602 A1 | 12/2002 | Stubler et al. | |
| 2003/0009287 A1* | 1/2003 | Howard et al. | 702/5 |
| 2003/0061211 A1* | 3/2003 | Shultz et al. | 707/3 |
| 2003/0158855 A1 | 8/2003 | Farnham et al. | |
| 2003/0221541 A1* | 12/2003 | Platt | 84/609 |
| 2004/0098362 A1 | 5/2004 | Gargi | |
| 2004/0225635 A1* | 11/2004 | Toyama et al. | 707/1 |
| 2004/0260762 A1* | 12/2004 | Fish | 709/201 |
| 2006/0080286 A1* | 4/2006 | Svendsen | 707/3 |
| 2006/0126944 A1* | 6/2006 | Loui et al. | 382/224 |

OTHER PUBLICATIONS

Measurements on a Logarithmic Scale, Dec. 14, 1998, http://mathforum.org/library/drmath/view/55574.html.*

Aucouturier et al "Scaling Up Music Playlist Generation" Sony Computer Science Laboratory C2002 IEEE.

* cited by examiner

ADAPTATION OF LOCATION SIMILARITY THRESHOLD IN ASSOCIATIVE CONTENT RETRIEVAL

CROSS REFERENCE TO RELATED APPLICATION(S)

This application claims the benefit of U.S. provisional application Ser. No. 60/632,137 filed Dec. 1, 2004, and International Application Number PCT/IB2005/053980, which are incorporated herein in whole by reference.

The present invention relates to the field of content retrieval, management and presentation, and to content item similarity threshold determination. In recent years, the storage capacity of storage devices and databases, including hard drives on personal computers and other types of storage media has been rapidly increasing. Storage capacity, by some estimates, doubles approximately every year or so, while network bandwidth also has been increasing very rapidly. As a result, storage devices store a greater amount of content to which user access needs to be facilitated. A user can be overwhelmed with content stored on a storage device or database, even on the user's own hard drive, and may not be able to retrieve content that is available on a network, such as the internet, unless the content is somehow managed or organized to provide convenient access for the user. Content that is not indexed or organized in a manner transparent to the user may be "lost" as far the needs of the user are concerned and be unlikely to be retrieved.

Many data retrieval schemes are known. Farnham et al., U.S. Patent Application Publication No. 2003/0158855 discloses automatic context associations, in which associations are dynamically generated between objects or metadata, such that a degree of similarity, represented as a numeric value, between computer files is determined. Stubler et al., U.S. Patent Application Publication No. 2002/0188602, discloses generation of captions or semantic labels for acquired images based on similarity of the acquired image with stored images by extracting metadata for the acquired image. Platt, U.S. Patent Publication No. 2003/0221541, discloses an automatic playlist generator, in which several seed songs, including "undesirable seed" songs are used to generate songs on a playlist. Cluts, U.S. Pat. No. 5,616,876, discloses selecting additional songs that are like a first set of songs, based on "style labels" for each song previously written by an editor. However, none of these references discloses setting a threshold for location similarity in selecting or rejecting target items. Prince, U.S. Patent Application Publication No. 2002/0099696, discloses fuzzy database retrieval in which a degree of similarity is given a score and threshold are used to select items to be retrieved. However, neither Prince nor the other references discloses or suggests setting a threshold based on a base location, nor setting the threshold based on a distance between the base location and an identified item location.

It is also possible of course for a user to retrieve content items, however attempting to locate similar items can be a time-consuming and onerous job, particularly if the content type of desirable items is not known or specified by the user. Further, as content items continue to accumulate in a storage device or database controlled by the user, the job of retrieving content items becomes ever more difficult.

Provided are a method, system, device, engine, apparatus, and computer-readable media that embodies or carries out the functions of a retrieval system. The selected candidate content item or items are provided to a user or database. A base location is determined. A first location is identified by extracting location data for a first identified content item. Then a first threshold may be set based on a criterion distance determined between the base location and the first location. A candidate location may be identified and the location data for candidate content item extracted. A distance between the base location and the first candidate location may be determined as a candidate distance. A candidate content item may be selected as similar or for retrieval based on the first candidate distance and the first threshold, and a selection signal for the selected candidate content is output, accordingly.

Further a second threshold based on the criterion distance may be set, which second threshold together with the first threshold comprises a range, and then candidate content items are selected if the first candidate distance is within the range.

The first locations may include a location of content item acquisition, a location of content item last usage, or a location of content item most usage. The location may be a content item current location, a content item most recent modification location, or a content item creation location.

The base location may be a current location of the first identified content item, a user home, a user office, a user vehicle, and a user current location.

The base location and the location data could be determined based on GPS information or based on user entry.

Further additional identified content items may be identified, locations and distances determined, so that the first threshold may also be set based on these criterion distance determined.

The following discussion and the foregoing figures describe embodiments of Applicant's invention as best understood presently by the inventors however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Figure 1:
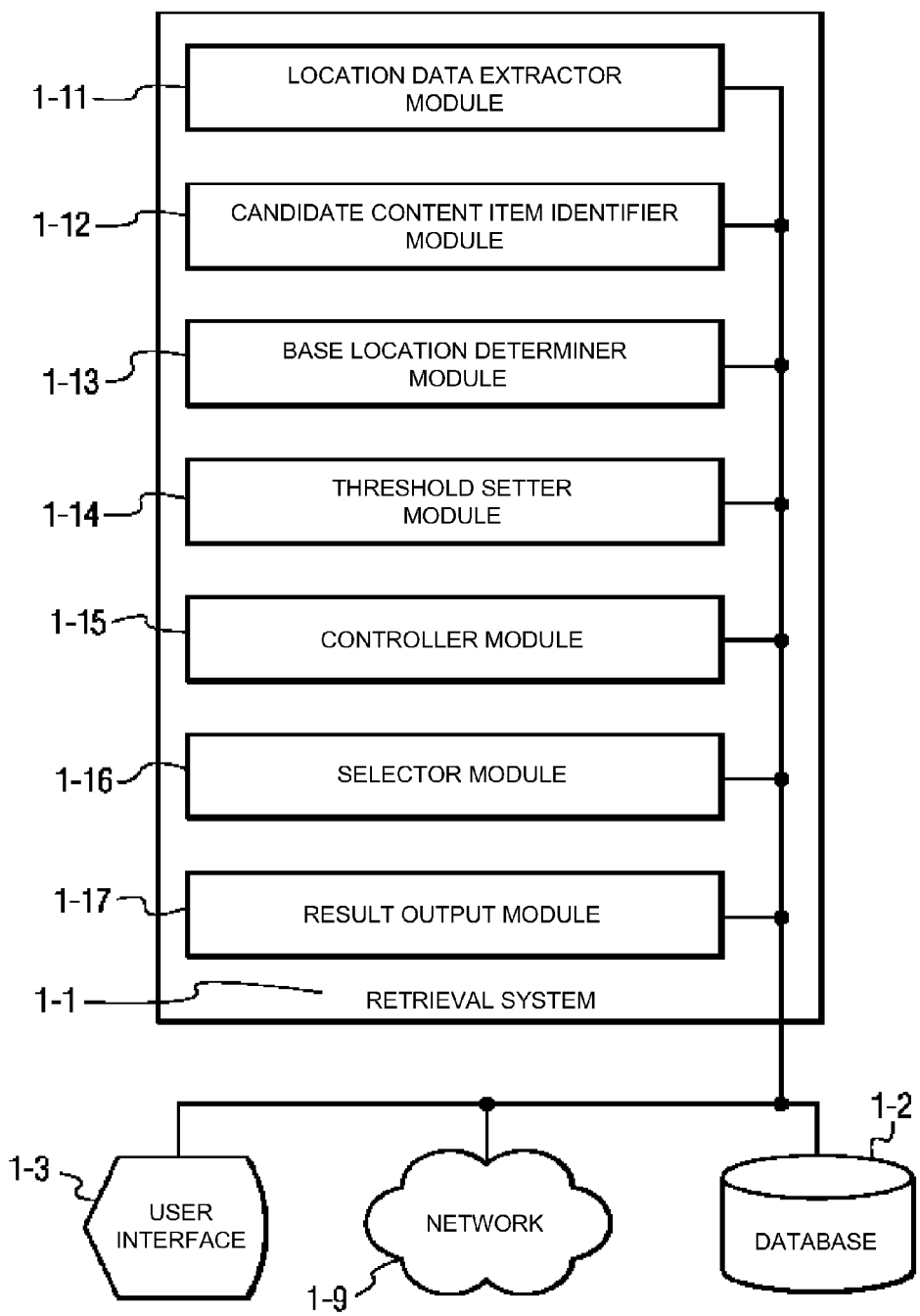
FIG. 1 is a schematic view of a retrieval system according to an embodiment of the present invention.

As shown in FIG. 1, the retrieval system 1-1 includes several modules, which will be described below. Modules of the retrieval system 1-1, or portions thereof, and/or the retrieval system as a whole, may be comprised of hardware, software, firmware, or a combination of the foregoing, however some modules may be comprised of hardware for example, while other modules may be comprised of software, firmware or a combination thereof.

It is to be understood that modules of the retrieval system need not all be located or integrated with the same device. A distributed architecture is also contemplated for the retrieval system, which may "piggy-back" off of suitable modules provided by existing devices.

The following description will refer to an retrieval system 1-1 that is physically integrated with or connected to a database 1-2 via a wired or wireless connection thereto. The retrieval system 1-1 may also be connected to or integrated with a GPS device (not shown). The database 1-2 may be embodied on a storage device such as on a hard drive of a personal computer, a personal video recorder, an entertainment system, an electronic organizer, a personal handheld device, a Jaz drive, or may be embodied as a commercial storage facility, such as a disk drive. It will be understood that the database 1-2 may include several storage devices that are connected, such that organization or grouping of content items on two or more of such devices is possible. It will further be understood that the database may be understood to include one or more storage media, such as disks, including CDs, DVDs, zip disks, floppy disks, data cartridges, or the like, which can be loaded onto and retrieved by the database 1-2. However, it will be understood that the retrieval system 1-1 is also capable of retrieving content via a network 1-9, such as a LAN, WAN, the internet, or the like.

As shown in FIG. 1, the retrieval system 1-1 includes a location data extractor 1-11, which is a module that collects certain types of data from a content item. The content item may be a video, or a video clip, a movie, a photo, a text file, music data, an audio file, or other type of multimedia data, a JPEG file, or XML data. For example, the video may be a home video shot on a digital video recorder, the movie may be commercially distributed film data, such as a film encoded as MPEG (including MPEG-2, MPEG-3, or the like), the photo may be a digital photograph data, or series of photographs or a photograph album, the text file may be a word processor produced file, a spreadsheet, or a computer code file, the music data may be an MP3 file or the like, and so forth.

The description data extracted by the location data extractor 1-11 includes information, such as metadata or usage data about the content item. Such information may also include location data for the content item, such as location of the creation of the item, place of acquisition of the item; the last/first/penultimate et cetera location of playback and/or editing of the content item; and, a place of most usage, for example, the item is mostly used in Amsterdam, or at a given street address, the item is mostly used in the living room, or in the user's home, or the like. "Mostly" as used herein may be based on an average use location, median use location, a mode of use location, or the like. Such usage history data is sometimes known as metadata, and conversely, types of metadata are sometimes referred to as usage history data.

The location information discussed herein may be one or many such similarity dimensions, or it may the only or the most weighty dimension. The degree to which such factors are weighted would depend on the application and the needs of the user.

It will be understood that such description data about the item may be located and extracted in a variety of ways, including from the item, from an index or database management file, or from an outside source such as from the World Wide Web connected to the retrieval system 1-1 via a wired or a wireless connection to the Internet 1-9.

The identified content item may be identified in one of several ways. A user may designate the item based on which other items, sometimes referred to as "candidate content items" are to be retrieved. Alternatively, a content item newly added or created may automatically be designated as an identified content item based on which other items are to be retrieved.

A base location is determined by base location determiner 1-13. Such a base location may be, for example, the current location of the first identified content item, the location of the user's home, office, or vehicle, or a user's current location, a location frequently visited by the user, or a location recently visited. A base location may also be the place where the user's presence was most detected or frequently detected (or a most detected place based on an average, median or mode of the detected places), or where in some relevant recent period of time, the user spent most of his time. If the user is using a handheld device, or a notebook computer, the base location may be a location at which the handheld device or computer notebook is frequently (or mostly) present or recently visited. Such handheld device or computer notebook presence may also be determined as the base location based on a relevant recent period of time. Also, the base location may be the location of the retrieval system 1-1. Such a base location may be entered or set by the user, previously programmed, determined from metadata in the first identified content item or from other documents to which the system has access, determined with reference to GPS data received via a GPS device, or determined from the internet or another network, or by combination of the foregoing.

The location data extractor 1-11 also determines the location of the identified content item or items and determines the distance between the location of the identified content item(s) and the base location. This distance is sometimes called a first criterion distance. The location may be determined by reference to metadata associated with the content item, GPS data, a database index, or by reference to the network 1-9, including for example the world wide web, by requesting user input, or a combination of the foregoing. The distance may be determined by referring to a table, by computation based on GPS information, by requesting user input, or by a combination of the foregoing.

Threshold setter 1-14 sets a threshold or range that candidate content items must meet to be selected. The threshold or range is set by threshold setter 1-14 based on the first criterion distance. For example, if the first criterion distance is the distance between neighboring cities, then the threshold could be a distance of approximately that distance.

Candidate content item identifier 1-12 identifies candidate content items in the database, over the network connection or from other sources, that are similar with respect to these metadata or other information and/or based on their distance from the base location to the distance of the first identified content item to the base location.

Controller 1-15 coordinates overall functioning of the retrieval system 1-1 and interacts with user interface 1-1, the database 1-2, the server 1-9, and the outside generally, and handles system settings.

Selector 1-16 selects qualifying candidate content items and result output 1-17 provides a results signal for the selected and/or the rejected candidate content items. Result output 1-17 interfaces with other devices and communication with the outside, including interfacing with a user (not shown). In particular retrieval result output 1-17 signals about the user interface of content items retrieved by the retrieval system 1-1. User interface 1-3 may be a separate device or may be integrated with another device or system, such as a personal computer or a personal video recorder, or one or more of the storage and other devices enumerated above.

There may be additional available identified content items. Thus, this process of location data extraction and distance determination may be repeated for any number of available identified content items 1-N, N being a positive integer greater than 1. Then, the candidate content item selection is performed based on an average of all such criterion distances.

Figure 2:
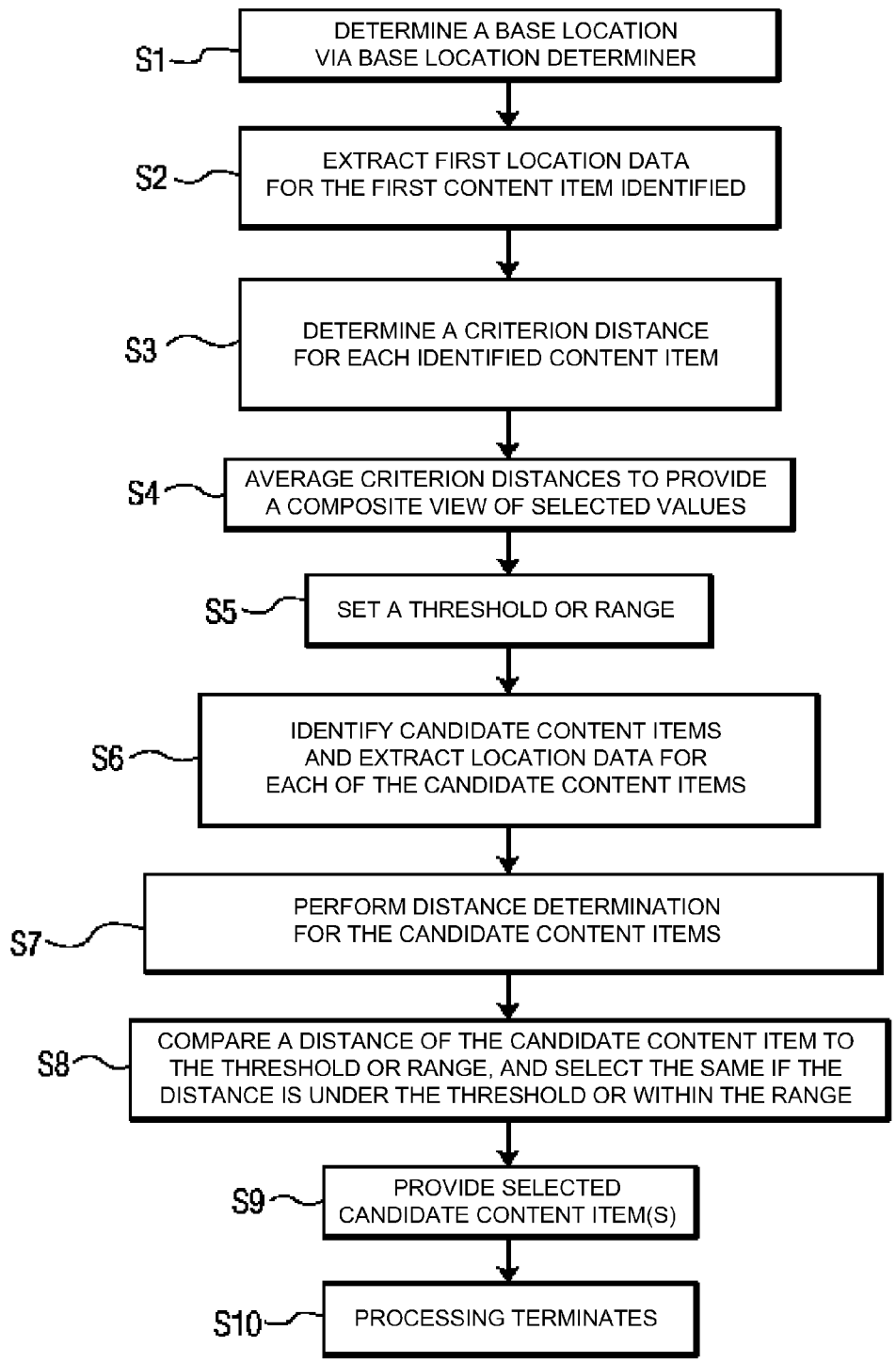
FIG. 2 is a flowchart of an operation of a system according to an embodiment of the present invention.

An operation of an embodiment of the present invention will now be described with reference to FIGS. 1-2. A first content item is identified, as described above, by a user via user interface 1-3 shown in FIG. 1, or automatically by the system, for example by a detection of a newly added content item or an isolated content item in database 1-2.

At S1, base location determiner 1-13 determines a base location, as discussed above. Location data extractor 1-11 of retrieval system 1-1 extracts first location data for the first content item identified, as stated at S2 of FIG. 2. At S2, additional identified content items may be similarly processed, for example if the user or the system designates several "anchor" documents based on which target documents are to be retrieved.

At S3, a criterion distance is determined for each identified content item, by determining a distance between the base location and the location of the identified content item. At S4, such criterion distances may be averaged to arrive at an average criterion distance. As used herein, average may be determined based on a computation of the arithmetic mean, mode, or median. Further, a simple sum of the values may be used as well as some such statistical function suitably selected to provide a composite view of the selected values.

At S5, a threshold or range is set based on the criterion distance(s) or the average criterion distance. For example, a threshold may be assigned such that a value of 1 or 0 may indicate a very small distance between the base location and the first identified content item, while a value of 9 or 10 may indicate a great distance. Alternatively, instead of using a scale of 1 to 10, thresholds may represent for example, "identical location", "very close location", or "close location," "far" or "very far" or some such designation. It will be understood that numerous other schemes for such values may be used without departing from the spirit of the present invention.

Further, a second threshold may similarly be chosen. The first threshold thus may represent a maximum distance, while the second threshold may represent a minimum distance, thus together the thresholds comprising a range. Candidate items would be selected only if their distance (the distance between the base location and the candidate content item location) falls within the range.

At S6, candidate content item identifier 1-12 of FIG. 1 identifies candidate content items in the database 1-2, over a network or elsewhere, while location data extractor 1-11 (FIG. 2) extracts location data for each of the candidate content items. The process of distance determination for the candidate content item is then performed at S7. Further identified content items may also be available, and the process of extracting the location data and determining distance values would continue for candidate content items 1-M.

At S8, a distance of the candidate content item is compared to the threshold or range by selector 1-16. If the distance is under the threshold or within the range then it is selected.

For instance, if the base location is determined as a street address in New York, N.Y. and the first identified content item is determined to be Garden City, Long Island, N.Y., then a distance of X miles, representing the distance between the two cities, is the first criterion distance. Based on this X miles distance, or based on an average of the criterion distances determined from identified content items 1-N, a threshold distance is set, for example, as "30 miles," or as "same state", as "close," or as "4" (4 being an integer assigned from 0-9, where 0 means in substantially the same location, and 9 meaning very far). Then, a distance of a candidate content item is compared with this threshold, and the candidate item is selected, at S8, if the distance of the candidate content item from the base location is within 30 miles, within "same state," within the "close," or with the distance ranking "4" threshold.

According to an aspect of the present invention, the threshold is set such that distance granularity is higher for locations geographically closer to the base location than for locations further away from the base location. Therefore, for example, if the distance from the base location were to be ranked on a scale of 1 to 10, then as the distance from the base location increased, longer distances would be encompassed by fewer gradations of the scale. Thus, if the criterion distance (the distance between the base location and an identified document or content item) is 1 mile, then a first candidate content item might be judged not similar if the candidate distance from the base is 30 miles. However, if the criterion distance is 100 miles, then a second candidate document might be judged similar even if the second candidate distance from the base is 600 miles. Such thresholding is based on the idea that often people intuitively think of differences in distance between farther locations as less important than between equally distant closer locations: the farther in distance we move from the relevant current base location, the less important, in terms of determining similarity, are the distances between locations of different items. Such thresholding is sometimes referred to herein as criterion distance-determined granularity thresholding.

As discussed, a range may also be generated at S5 by threshold setter 1-14, using a maximum and a minimum threshold, based on the spread in the set of identified content item distance values. Thus, using the above-discussed example with just one identified content item, the maximum threshold would be as described, and a minimum threshold, for example, "different city," "at least 5 miles," "very close," distance ranking 2. Then, the range for content items that are selected would be "different city, same state distance," "5-30 miles," "very close-close distance," or "2-4" depending on the system of thresholding/ranges used.

According to an aspect of the invention, multiple base locations, for instance, a work base location, a vacation location, and a home base location could be used, and the criterion distance-determined granularity would be applied for each base location separately. Thus, the level of granularity would decrease with distance from base location 1 (the farther away the candidate document location, the greater the distances that would be considered similar), and would similarly decrease with distance from base location 2. The idea is that for a person who, for example, spends significant vacation time or work time at a second location, the differences in distance nearer to that second base location would matter more than those farther away, and therefore a higher granularity would have to used.

Such second, third, L-th, et cetera, (L being an integer greater than 3) base location could be set by the user or determined by the system according, for example, to the ways of determining base locations discussed above. Thus, for example, the system could set as a second base location a location for which the system determines a frequent presence of the user (based on GPS data, presence of a handheld device or the like), or can determine that a significant number or percentage of documents associated with the user (for example, documents residing in the user's computer, database, handheld, et cetera) have a content item location (for example, date/time of creation or last use or the like) in a particular location different from the first base location. Criterion distances could then be determined, and thresholds set according to the criterion distance-determined granularity, based on such additional base location.

According to an aspect of the present invention, the content item retrieved may be of a content type different from the content type of the user-selected content item. For example, if the user-selected content item is of the type music file, or MP3, then the retrieved content item may be of the content type photograph data. In this way, for example, pictures of a certain genre may be retrieved to match user-selected music based on location similarity.

This (or these) selected candidate content item(s) are provided to the user or to the user interface 1-3 at S9. Alternatively (or additionally), a signal may be provided if a candidate content item is rejected. A signal may be provided directly to the database 1-2 to cause retrieval of the selected candidate item to the database or to the user interface 1-3. A notification may be provided to user interface 1-3 to notify a user (not shown) of a retrievable content item. The notification may consist of an identification of the content item to be retrieved, a description of the content item, a URL or a link to the content item, a retrieval of the entire content item or a portion thereof, or a combination of the foregoing. The system may also be used to group the retrieved item selected with the anchor item to organize a database. At S10, processing terminates.

Embodiments of the present invention provided in the foregoing written description are intended merely as illustrative examples. It will be understood however, that the scope of the invention is provided in the claims.

What is claimed is:

1. A content item retrieval method, the method comprising:
    determining multiple base locations, wherein determining each base location is based on GPS information or user entry, each base location being a location from which to apply a corresponding criterion distance-determined granularity thresholding for setting a threshold for location similarity in selecting or rejecting target items for content item retrieval, wherein criterion distance-determined granularity thresholding is applied for each base location of the multiple base locations separately based on differences in distance between farther locations being less important than between equally distant closer locations, further wherein the farther in distance moved from a corresponding base location of the multiple base locations, the less important, in terms of determining similarity, are differences in distance between locations of different content items at the corresponding further distances from the corresponding base location;
    extracting, as a first anchor item location, location data for a first identified anchor content item, the first identified anchor content item for designating which candidate content items for which a content type is not known or specified by a user are to be retrieved;
    setting a first threshold based on a criterion distance that candidate content items must meet to be selected, wherein the first threshold comprises an assigned value on a scale of 1 to 10, where a value of 1 indicates a very small distance between a corresponding base location and candidate content item and a value of 10 indicates a great distance between the corresponding base location and candidate content item, and wherein the criterion distance is determined, using criterion distance-determined granularity thresholding, as a distance between the corresponding base location of the multiple base locations and the first anchor item location, further wherein the distance from the corresponding base location is ranked on the scale and as the distance from the corresponding base location increases, then longer distances are encompassed by fewer gradations of the scale, such that distance granularity on the scale is higher for locations geographically closer to the corresponding base location than for locations further away from the corresponding base location;
    extracting, as a first candidate location, the location data for a first candidate content item, and determining, as a first candidate distance, the distance between the corresponding base location of the multiple base locations and the first candidate location;
    selecting the first candidate content item as similar for content item retrieval based on (i) the first candidate distance that corresponds to the distance between the corresponding base location of the multiple base locations and the first candidate location and (ii) the first threshold that is based upon the criterion distance, wherein the first candidate content item is selected as being similar to the first identified content item in response to the determined first candidate distance, when compared to the first threshold, being within or with the first threshold; and
    outputting a selection signal for indicating retrieval of the first candidate content item when the first candidate location of the candidate content item is selected as being similar to the first identified content item for content item retrieval.

2. The method of claim 1, further comprising:
    setting a second threshold based on the criterion distance, which second threshold together with the first threshold comprises a range, and wherein selecting the first candidate content item further includes selecting the first candidate content item as being similar to the first identified content item in response to the first candidate distance being within the range.

3. The method of claim 1, wherein at least one of the first location and the first candidate location comprises at least one of a location of content item acquisition, a location of content item last usage, and a location of content item most usage.

4. The method of claim 1, wherein at least one of the first location and the first candidate location comprises at least one of a content item current location, a content item most recent modification location, and a content item creation location.

5. The method of claim 1, wherein the base location is one of a current location of the first identified content item, a frequently visited location, a recently visited location by a user, and location of most presence of a user.

6. The method of claim 1, wherein the base location is one of a user home, a user office, a user vehicle, and a user current location.

7. The method of claim 1, wherein at least one of the base location and the location data is determined based on GPS information.

8. The method of claim 1, further comprising:
    extracting, as a second location, location data for a second identified content item, the second identified content item for designating which additional candidate content items are to be retrieved; and
    setting the first threshold based on the first criterion distance and also on a second criterion distance, wherein the second criterion distance is determined as a distance between the base location and the second location.

9. A content item retrieval system comprising:
    a base location extractor module configured to determine multiple base locations, based on GPS information or user entry, each base location being a location from which to apply a corresponding criterion distance-determined granularity thresholding for setting a threshold for location similarity in selecting or rejecting target items for content item retrieval, wherein criterion distance-determined granularity thresholding is applied for each base location of the multiple base locations separately based on differences in distance between farther locations being less important than between equally distant closer locations, further wherein the farther in distance moved from a corresponding base location of the multiple base locations, the less important, in terms of determining similarity, are differences in distance between locations of different content items at the corresponding further distances from the corresponding base location;
a location data extractor module configured to extract, as a first anchor item location, location data for a first identified anchor content item and to determine, as a criterion distance, a distance determined between a corresponding base location and the first anchor item location, the first identified content item for designating which candidate content items for which a content type is not known or specified by a user are to be retrieved;
a threshold setter module configured to set a first threshold based on the criterion distance that the candidate content items must meet to be selected, wherein the first threshold comprises an assigned value on a scale of 1 to 10, where a value of 1 indicates a very small distance between a corresponding base location and candidate content item and a value of 10 indicates a great distance between the corresponding base location and candidate content item, and wherein the criterion distance is determined, using criterion distance-determined granularity thresholding, as a distance between the corresponding base location of the multiple base locations and the first anchor item location, further wherein the distance from the corresponding base location is ranked on the scale and as the distance from the corresponding base location increases, then longer distances are encompassed by fewer gradations of the scale, such that distance granularity on the scale is higher for locations geographically closer to the corresponding base location than for locations further away from the corresponding base location;
said location data extractor module further being configured to extract, as a first candidate location, the location data for a first candidate content item, and to determine, as a first candidate distance, the distance between the corresponding base location of the multiple base locations and the first candidate location;
a selector module configured to select the first candidate content item as similar for content item retrieval based on (i) the first candidate distance that corresponds to the distance between the corresponding base location of the multiple base locations and the first candidate location and (ii) the first threshold that is based upon the criterion distance, wherein the first candidate content item is selected as being similar to the first identified content item in response to the determined first candidate distance, when compared to the first threshold, being within or with the first threshold;
a result output module configured to output a selection signal for indicating retrieval of the first candidate content item when the first candidate location of the candidate content item is selected as being similar to the first identified content item for content item retrieval;
a controller configured to coordinate an overall functioning of respective modules;
a user interface; and
a storage device, wherein said controller is further configured to interact with the user interface and the storage device, the storage device for storage of content items subject to being retrieved, wherein the controller, the base location extractor, the location extractor, the threshold setter, the selector, and the result output modules, portions thereof, and the retrieval system as a whole, comprise a combination of hardware, software, and firmware configured to perform the corresponding functions of the respective controller and modules.

10. The system of claim 9, further comprising said threshold setter module setting a second threshold based on the criterion distance, which second threshold together with the first threshold comprises a range, and said selector module for selecting the first candidate content item as being similar in response to the first candidate distance being within the range.

11. The system of claim 9, wherein at least one of the first location and the first candidate location comprises at least one of a location of content item acquisition, a location of content item last usage, and a location of content item most usage.

12. The system of claim 9, wherein at least one of the first location and the first candidate location comprises at least one of a content item current location, a content item most recent modification location, and a content item creation location.

13. The system of claim 9, wherein the base location is one of a current location of the first identified content item and a frequently visited location, a recently visited location by a user, and location of most presence of a user.

14. The system of claim 9, wherein the base location is one of a user home, a user office, a user vehicle, and a user current location.

15. The system of claim 9, wherein at least one of the base location and the location data is determined based on one of user input and GPS information.

16. The system of claim 9, further comprising:
said location data extractor module being further configured to extract, as a second location, location data for a second identified content item, the second identified content item for designating which additional candidate content items are to be retrieved; and
said threshold setter module being further configured to set the first threshold based on the first criterion distance and also on a second criterion distance, wherein the second criterion distance is determined as a distance between the base location and the second location.

* * * * *